United States Patent
Emslander et al.

(10) Patent No.: US 6,857,737 B2
(45) Date of Patent: *Feb. 22, 2005

(54) UV INK PRINTED GRAPHIC ARTICLE

(75) Inventors: Jeffrey O. Emslander, Afton, MN (US); David J. Kinning, Woodbury, MN (US); Stephen P. Polski, Ham Lake, MN (US); Caroline M. Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/328,523

(22) Filed: Dec. 23, 2002

(65) Prior Publication Data

US 2004/0119804 A1 Jun. 24, 2004

(51) Int. Cl.[7] .................................................. B41J 2/01
(52) U.S. Cl. ........................ 347/105; 347/101; 428/32.1
(58) Field of Search ................................ 347/105, 101, 347/100; 428/195, 32.1

(56) References Cited

U.S. PATENT DOCUMENTS

| | | | |
|---|---|---|---|
| 4,737,224 A | | 4/1988 | Fitzer et al. |
| 5,215,814 A | * | 6/1993 | Gager et al. ................ 428/331 |
| 5,462,768 A | | 10/1995 | Adkins et al. |
| 5,858,516 A | * | 1/1999 | Ou-Yang ..................... 428/195 |
| 6,200,647 B1 | | 3/2001 | Emslander et al. |
| 6,316,120 B1 | * | 11/2001 | Emslander .................. 347/105 |
| 6,589,636 B2 | * | 7/2003 | Emslander et al. ......... 428/195 |
| 6,623,841 B1 | * | 9/2003 | Venkatasanthanam et al. ........................ 428/195 |
| 2002/0086914 A1 | | 7/2002 | Lee et al. |

FOREIGN PATENT DOCUMENTS

| | | |
|---|---|---|
| EP | 0 254 365 B1 | 1/1988 |
| EP | 0 410 051 A1 | 1/1991 |
| EP | 0 464 921 A1 | 1/1992 |
| WO | WO 92/13924 | 8/1992 |
| WO | WO 02/061002 A2 | 8/2002 |
| WO | WO 02/062894 A1 | 8/2002 |

OTHER PUBLICATIONS

U.S. patent application Ser. No. 10/162,540, filed Mar. 6, 2002.

* cited by examiner

*Primary Examiner*—Manish Shah
(74) *Attorney, Agent, or Firm*—Scott A. Bardell

(57) ABSTRACT

In one aspect, the invention provides an imaged article that includes A) an image receptive layer bonded to a core layer and B) an image on the image receptive layer, the image including a UV-curable or UV-cured ink and methods of using the imaged article.

20 Claims, 1 Drawing Sheet

UV INK PRINTED GRAPHIC ARTICLE

BACKGROUND

The present invention relates to an ink receptive layer and an image article imaged with a UV-curable ink.

Typical promotional window graphics fall into two main areas, adhesive coated vinyl and cling vinyl films. Such films are usually screen printed with UV-curable inks. The artwork utilizes line colors, which tends to maximize the visual impact of the graphic as compared to 4-color printing. The line color printing creates an almost continuous layer of ink on the graphic film. This large amount of ink (up to five layers of UV-cured ink in localized areas of the graphic) significantly decreases the ductile strength of the film, which becomes more brittle and can break or tear more easily as a result of the brittle UV-cured ink layers adhering to the film.

Imaged cling vinyl films tend to have very good visual presentation when first applied to glass. However, such imaged films tend to lift and bubble over time because of very low peel adhesion to the glass. Adhesive coated vinyl graphic films adhere well to glass. However, such graphic films can tear or break into small pieces during removal due to decreased ductility from the UV-cured ink layers. Such tearing or breakage makes removal of the graphic films more difficult, and increases removal time.

In addition, anchorage of the UV-curable ink after cure to the film is important to the initial application of the graphic to a substrate. During application of the graphic to a substrate, stretching (or extension) of the graphic can occur. Current vinyl graphics films have the potential for the ink to flake off at low film extensions, decreasing the visual impact of the graphic.

One method to alleviate tearing of the film and flaking of the ink is to significantly increase the thickness of the vinyl film. However, if the film thickness is increased to, for example, above 6 mils (above about 150 micrometers), to address these issues, the graphic costs become commercially prohibitive.

Polyolefin based graphics films are also used for promotional window graphics. Although these films have improved tear strength after imaging, the adhesion of UV-curable screen print inks to the polyolefin is typically less that that of vinyl, resulting in more pronounced ink flaking.

SUMMARY

In one aspect, the invention provides an imaged article that comprises A) an image receptive layer bonded to a core layer and B) an image on the image receptive layer, the image comprising a UV-curable or UV-cured ink. The image receptive layer comprises a blend of i) a carrier resin comprising modified polyolefin or polyurethane resin, or combinations thereof; and ii) an ink-anchoring resin selected from the group consisting of copolymers of methyl methacrylate with butyl acrylate, butyl methacrylate, isobutyl methacrylate, or isobornyl methacrylate; copolymers of isobutylmethacrylate and butyl methacrylate; polymers of isobutyl methacrylate; copolymers of urethane and acrylate; acrylic polymers, and combinations thereof.

In another aspect, the invention provides a method of using an imaged graphic article of the invention. The method comprises the steps of: providing an imaged graphic article comprising a UV-curable or UV-cured ink, the graphic article comprising a core layer bonded to an image receptive layer, and an adhesive on a surface of the core layer opposite the image receptive layer, the image receptive layer comprising a blend of i) a carrier resin comprising modified polyolefin or polyurethane resin, or combinations thereof; and ii) an ink-anchoring resin selected from the group consisting of copolymers of methyl methacrylate with butyl acrylate, butyl methacrylate, isobutyl methacrylate, or isobornyl methacrylate; copolymers of isobutylmethacrylate and butyl methacrylate; polymers of isobutyl methacrylate; copolymers of urethane and acrylate; acrylic polymers, and combinations thereof, adhering said imaged article onto a smooth surface for a period of time wherein said image graphic is removed in substantially one piece.

DETAILED DESCRIPTION

Figure 1:
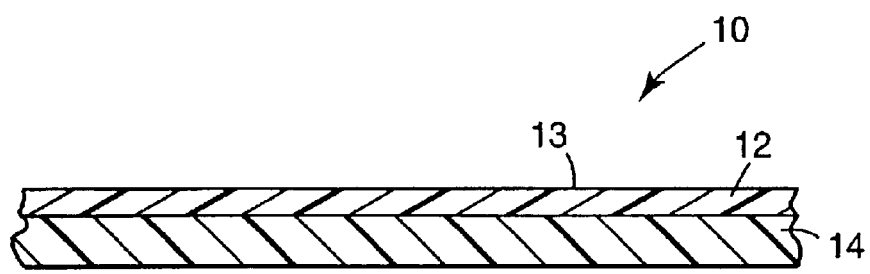
FIG. 1 is a schematic cross-sectional view illustrating an embodiment of the invention including an image receptive layer and a core layer.

In one embodiment, the invention provides an image receptor medium comprising a single extrudable image receptive layer on a substrate or core layer. The image receptive layer is a layer that is receptive to UV-curable inks and provides excellent adhesion to the cured ink. The image receptive layer comprises a blend of a carrier resin and ink-anchoring resin. In the embodiment shown in FIG. 1, the image receptor medium 10 comprises a core layer 14 having two major surfaces and an image receptive layer 12 in contact and coextruded with the core layer 14 to form the image receptor medium 10. Alternatively, an image receptive layer 12 may be extrusion coated or solvent cast directly onto a core layer.

The carrier resin may be any resin or blend of resins that is compatible with the ink-anchoring resin described below. An ink-anchoring resin is compatible with the carrier resin if a film comprising the carrier resin and an ink-anchoring resin can be melt blended and extruded to form a self supporting film or can be coextruded with, or extrusion coated onto, a core layer film as a support. The carrier resins are generally olefin-based.

Generally, copolymers comprising the reaction product of olefin monomers and a sufficient amount of at least one polar monomer (modified olefin resins) provide the desired carrier resin. Specific examples of useful copolymers include copolymers of ethylene and vinyl acetate, carbon monoxide, and methyl acrylate; copolymers of acid and/or acrylate modified ethylene and vinyl acetate; and terpolymers of ethylene and any two polar monomers, for example, vinyl acetate and carbon monoxide and combinations thereof.

Other useful carrier resins include urethanes and polyesters such as thermoplastic polyurethanes and polyether-ester elastomers. Useful thermoplastic urethane resins include MORTHANE PN343-200, MORTHANE PN 3429-218, MORTHANE PN 03-214, and MORTHANE L 425-181 from Rohm and Haas, Philadelphia, Pa.; ESTANE 58315, ESTANE 58271, and those sold under the trade designation ELASTOLLAN from BF Goodrich, Cleveland, Ohio; TEXIN DP7-3006 and TEXIN DP7-3007 from Bayer Corporation, Pittsburgh, Pa.; PELLETHANE 2354 and PELLETHANE 2355 from The Dow Chemical Company, Midland Mich.; and NEOREZ R-600 aliphatic urethane dispersion from Avecia Ltd., Waalwik, The Netherlands.

Useful polyether-ester resins include HYTREL G3548L, HYTREL G4078W, and HYTREL G4778 from E.I. DuPont De Nemours, Wilmington, Del. Other useful copolyester resins include those available from Eastman Chemical, Kingsport, Tenn., under the trade designation EASTAR.

Commercially available modified olefin resins that are useful as carrier resins include: BYNEL 3101, an acid-acrylate modified ethylene vinyl acetate copolymer; ELVALOY 741, a terpolymer of ethylene/vinyl acetate/carbon monoxide; ELVALOY 4924, a terpolymer of ethylene/vinyl acetate/carbon monoxide; ELVALOY 1218AC, a copolymer of ethylene and methyl acrylate; and FUSABOND MG-423D, a modified ethylene/acrylate/carbon monoxide terpolymer; and combinations thereof. All are available from E.I. DuPont De Nemours.

Typically the carrier resin is present in the image receptive layer at a level of from about 50 to about 90 weight percent. In other embodiments, the carrier resin is present in the image receptive layer in an amount of from at least about 30 weight percent, at least about 50 weight percent, and least about 70 weight percent.

Generally, useful ink-anchoring resins include (meth)acrylic resins such as PARALOID and ACRYLOID resins from Rohm and Haas. Useful (meth) acrylic resins have a Tg of 90° C. or less.

Specific examples of useful (meth) acrylic resins include copolymers of methyl methacrylate with butyl acrylate, butyl methacrylate, isobutyl methacrylate, or isobornyl methacrylate (e.g., PARALOID DM-55, PARALOID B48N, PARALOID B66, ELVACITE 2550); copolymers of isobutylmethacrylate and butyl methacrylate (e.g., ELVACITE 2046); isobutyl methacrylate resins (e.g., PARALOID B67); and copolymers of urethanes and acrylates such as NEOCRYL A-612 and NEOPAC R-9000 aqueous acrylic emulsions from Avecia Ltd.

The ink-anchoring resin is typically present in the image receptive layers of the invention in an amount of from about 10 to about 50 weight percent and any fractional or whole weight percent between 10 and 50 weight percent. In other embodiments, the ink-anchoring resin is present in the image receptive layers of the invention in an amount of from about 10 and about 30, and from about 15 to about 25 weight percent and any fractional or whole weight percent between 10 and 30 and 15 and 25 weight percent, respectively.

Typically, the image receptive layer is at least 0.1 mils (2.5 micrometers) thick, and in other embodiments, the image receptive layer has a thickness that ranges from about 0.7 mils (17.8 micrometers) to about 2.0 mils (50.8 micrometers) thick, and may be any whole or fractional thickness in between 0.7 mils (17.8 micrometers) and 2 mils (50.8 micrometers).

The image receptive layer may include one or more filler materials. Inorganic fillers such as crystalline and amorphous silica, clay particles, aluminum silicate, titanium dioxide and calcium carbonate, and the like are a preferred additive in order to impart one or more of desirable properties, such as, improved dot gain and color density, and improved abrasion resistance. The concentration of such fillers in the image receptive layers of the invention typically range from about 0.1 weight percent to about 25 weight percent by weight. In another embodiment, the concentration of such fillers in the image receptive layers of the invention typically ranges from about 0.5 weight percent to about 15 weight percent.

To enhance durability of the image receptive layer, especially in outdoor environments exposed to sunlight, a variety of commercially available stabilizing chemicals can be added optionally to the primer compositions. These stabilizers can be grouped into the following categories: heat stabilizers, UV light stabilizers, and free-radical scavengers.

Heat stabilizers are commonly used to protect the resulting image graphic against the effects of heat and are commercially available from Witco Corp., Greenwich, Conn., under the trade designation MARK V 1923; and Ferro Corp., Polymer Additives Div., Walton Hills, Ohio, under the trade designations SYNPRON 1163, FERRO 1237, and FERRO 1720. Such heat stabilizers can be present in amounts ranging from about 0.02 to about 0.15 weight percent.

Ultraviolet-light stabilizers can be present in amounts ranging from about 0.1 to about 5 weight percent of the total primer or ink. Benzophenone type UV-absorbers are commercially available from BASF Corp., Parsippany, N.J., under the trade designation UVINOL 400; Cytec Industries, West Patterson, N.J., under the trade designation CYASORB UV 1164; and Ciba Specialty Chemicals, under the trade designations TINUVIN 900 and TINUVIN 1130.

Free-radical scavengers can be present in an amount from about 0.05 to about 0.25 weight percent of the total primer composition. Nonlimiting examples of free-radical scavengers include hindered amine light stabilizer (HALS) compounds, hydroxylamines, sterically hindered phenols, and the like.

HALS compounds are commercially available from Ciba Specialty Chemicals, under the trade designations TINUVIN 292 and TINUVIN 123; and Cytec Industries, under the trade designation CYASORB UV3581.

In general, the image receptive layer is typically substantially free of colorant. However, it may also contain colorants to provide a uniform background colored film.

In an embodiment of the invention, a core layer 14 is included in the image receptor medium, for example, to reduce the cost and/or enhance the physical properties of the medium. The core layer 14 is most commonly white and opaque for graphic display applications, but could also be transparent, translucent, or colored opaque. Core layer 14 can comprise any polymer having desirable physical properties for the intended application. Properties of flexibility or stiffness, durability, tear resistance, conformability to non-uniform surfaces, die cuttability, weatherability, solvent resistance (from solvents in inks), resistance to gasoline and other fuels, heat resistance and elasticity are examples. For example, a graphic marking film used in short term outdoor promotional displays typically can withstand outdoor conditions for a period in the range from about 3 months to about one year or more and exhibits tear resistance and durability for easy application and removal.

The material for the core layer is a resin capable of being extruded or coextruded into a substantially two-dimensional film and exhibits tear resistance. Examples of suitable materials for the core layer include polyester, polyolefin, polyamide, polycarbonate, polyurethane, polystyrene, acrylic, plasticized polyvinyl chloride, or combinations thereof. In an embodiment where the image receptor layer is extrusion coated onto a core layer, the core layer may comprise materials that have the same physical properties as described above, but may not be extrudable. Examples of such materials include polypropylene, polyethylene terephthalate, polyethylene coated papers, plasticized polyvinyl chloride cast from organosols, calendered plasticized polyvinyl chloride, fabrics, nonwoven materials, scrims, and the like.

In another embodiment, the core layer comprises a non-plasticized polymer to avoid difficulties with plasticizer migration and staining in the image receptor medium. In yet another embodiment, the core layer comprises a polyolefin that is a propylene-ethylene copolymer containing about 6 weight percent ethylene. Resins comprising poly vinylchloride may also be used as the core layer but are not typical since such resins may not provide adequate tear resistance.

The core layer may also contain other components such as pigments, fillers, ultraviolet stabilizing agents, slip agents, antiblock agents, antistatic agents, and processing aids familiar to those skilled in the art. The core layer is commonly white opaque, but may also be transparent, colored opaque, or translucent.

A typical thickness of the core layer 14 is in the range from 0.5 mils (12.7 micrometers) to 12 mils (305 micrometers). However, the thickness may be outside this range providing the resulting image receptor medium is not too thick to feed into a printer or an image transfer device, that is, any device capable of providing an image-wise layer of UV-curable ink onto the receptive layer. A useful thickness is generally determined based on the requirements of the desired application.

Figure 2:
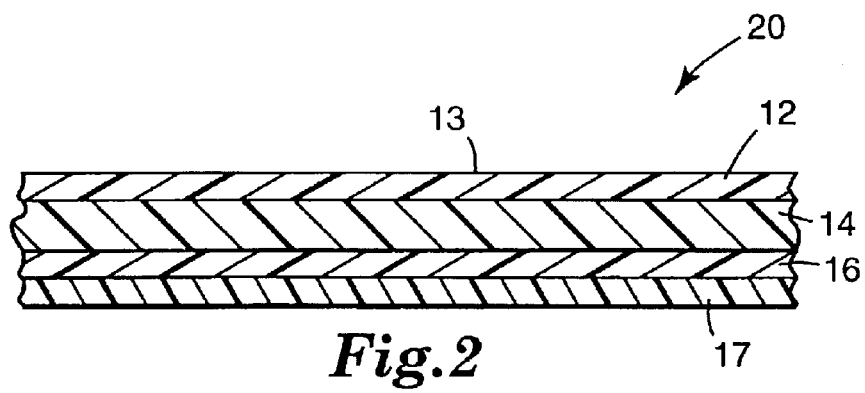
FIG. 2 is a schematic cross-sectional view illustrating an embodiment of the invention including an image receptive layer and a core layer and an optional prime layer.

As illustrated in FIG. 2, optional prime layer 16 is located on the surface of core layer 14 opposite image receptive layer 12. In the case where the image receptor medium does not include a core layer (not shown), the prime layer is located on the surface of the image receptive layer 12 opposite the outer surface 13. The prime layer serves to increase the bond strength between the substrate layer and an adhesive layer 17 if the bond strength is not sufficiently high without the prime layer. The presence of an adhesive layer makes the image receptor medium useful as an adhesive backed graphic marking film.

Although it is preferable to use a pressure sensitive adhesive, any adhesive that is particularly suited to the substrate layer and to the selected application can be used. Such adhesives are those known in the art and may include aggressively tacky adhesives, pressure sensitive adhesives, repositionable or positionable adhesives, hot melt adhesives, and the like.

The image receptor media of the invention may also have an optional tie layer (not shown) between image receptive layer 12 and the core layer 14. A tie layer is used to improve adherence between the image receptive layer and the core layer. Useful tie layers include extrudable resins such as ethylene vinyl acetate resins, and modified ethylene vinyl acetate resins (modified with acid, acrylate, maleic anhydride, individually, or in combinations). The tie layer may consist of these materials by themselves or as blends of these resins with the carrier resin. Use of tie layer resins is well known in the art and varies depending on the composition of the two layers to be bonded. Tie layers for extrusion coating could include the same types of materials listed above and other materials such as polyethyleneimine, which are commonly used to enhance the adhesion of extrusion coated layers. Tie layers can be applied to the core layer or image receptive layer by coextrusion, extrusion coating, laminating, or solvent coating processes.

The UV-curable screen printable inks useful in combination with the invention include Screen Print Ink Series 9700, available from 3M Company, St. Paul, Minn.; DURACAL and PLASTICAL brand UV-curable inks, available from Sericol Ltd. Kent, England; UVN-MP UV-curable inks, available from Coates Screen, St. Charles, Ill., and 3200 and 3800 series UV-curable inks, available from Nazdar, Shawnee, Kans. Useful UV-curable inkjet inks are described in U.S. Publication No 2002086914, and PCT Publication Nos. WO 200261002 and WO 200262894, incorporated herein by reference.

The image receptor medium of this invention can be made by a number of methods. For example, image receptive layer 12 and optional layers 14 and 16 can be coextruded using any suitable type of coextrusion die and any suitable method of film making such as blown film extrusion or cast film extrusion. Alternatively, layer 12 can be extrusion coated onto a substrate or a core layer or other support. Adhesive layer 17 may be coextruded with the other layers, transferred to the image receptor medium from a liner, or directly coated onto the image receptor medium in an additional process step. For the best performance in coextrusion, the polymeric materials for each layer are chosen to have similar properties such as melt viscosity. Techniques of coextrusion are found in many polymer processing references, including Progelhof, R. C., and Throne, J. L., "Polymer Engineering Principles", Hanser/Gardner Publications, Inc., Cincinnati, Ohio, 1993. Alternatively, one or more of the layers may be extruded as a separate sheet and laminated together to form the image receptor medium. The finished image receptor medium does not require surface treatment methods such as corona treatment to improve the image receptivity of the image receptor medium for certain applications, as described in the prior art.

The imaged, polymeric sheets may be a finished product or an intermediate and are useful for a variety of articles including signage and commercial graphics films. Signage includes various retroreflective sheeting products for traffic control as well as non-retroreflective signage such as backlit signs.

The article is suitable for use as roll-up signs, flags, banners, and other articles including other traffic warning items such as roll-up sheeting, cone wrap sheeting, post wrap sheeting, barrel wrap sheeting, license plate sheeting, barricade sheeting, and sign sheeting; vehicle markings and segmented vehicle markings; pavement marking tapes and sheeting; as well as retroreflective tapes. The article is also useful in a wide variety of retroreflective safety devices including articles of clothing, construction work zone vests, life jackets, rainwear, logos, patches, promotional items, luggage, briefcases, book bags, backpacks, rafts, canes, umbrellas, animal collars, truck markings, trailer covers, and curtains, etc.

Commercial graphic films include a variety of advertising, promotional, and corporate identity imaged films. The films typically comprise a pressure sensitive adhesive on the non-viewing surface in order that the films can be adhered to a target surface such as an automobile, truck, airplane, billboard, building, awning, window, floor, etc.

In an example of an imaging process, the image receptor medium is screen printed directly with a UV-curable ink, thereby receiving the desired image without the extra image transfer step. The techniques and materials for practicing screen-printing are described in U.S. Pat. No. 4,737,224, the disclosure of which is incorporated by reference herein. The imaged film is then used as described above. The image receptive layer of the present invention is particularly suitable for screen-printing of UV-curable inks because the image receptive layer is extremely tolerant of the effects of UV light used to cure solventless inks used in screen-printing. An example of such inks is disclosed in U.S. Pat.

No. 5,462,768, which disclosure is incorporated by reference herein.

In another example of an imaging process, the image receptor medium is fed into an inkjet printer and printed directly with the desired image. The inkjet printer can print using UV-curable piezo inkjet inks. Piezo inkjet printers include those made by Idanit Technologies, Ltd. of Rishon Le Zion, Israel; and Océ Arizona 30 Piezo Ink Jet printer available from Océ Wide Format Printing Systems, Eagan, Minn.

The invention will now be described further by way of the following examples.

same method but by running subsequent samples at 5 percent increments of elongation and checking for loose ink on each tested sample.

Elmendorf Tear Test

Elmendorf tear testing was carried out according to ASTM D1922.

Example 1 and Comparative Examples C1, C2, C3, and C4

The film used in Example 1 was 102 micrometers (4 mils) in gauge (thickness). The film contained the following layers in order shown in Table 1.

TABLE 1

| Layer No. | Gauge (thickness) micrometers | mils | Layer Function | Trade Name | Constituents Description | Supplier | Percent in layer |
|---|---|---|---|---|---|---|---|
| 1 | 30.5 | 1.2 | Ink receptor | BYNEL 3101 | Acid/acrylate modified ethylene vinyl acetate resin | E.I. DuPont De Nemours, Wilmington, DE | 62.0% |
| | | | | ELVALOY 741 | A terpolymer of ethylene/vinyl acetate carbon monoxide/ethylene | | 16.7% |
| | | | | PARALOID B67N | An isobutyl methacrylate polymer | Rohm and Haas, Philadelphia, PA | 16.8% |
| | | | | AMPACET 10407 | Hindered amine light stabilizer (HALS) | Ampacet U.S.A., Tarrytown, NY | 4.5% |
| 2 | 69.0 | 2.7 | Core layer | DOW 2045 LLDPE | Linear low density polyethylene | Dow Chemical Company, Midland, MI | 68.0% |
| | | | | STANDRICH 11937 TiO$_2$ | Titanium dioxide concentrate | Standrich Color Corporation, Social Circle, GA | 28.0% |
| | | | | AMPACET 10407 | Hindered amine light stabilizer (HALS) | Ampacet U.S.A., Tarrytown, NY | 4.0% |
| 3 | 2.54 | 0.1 | Prime layer for adhesive | DOW PRIMACOR 1410 | Ethylene-acrylic acid copolymer | DOW Chemical Company, Midland, MI | 80% |
| | | | | POLYFIL MT 5000 | Talc antiblock concentrate resin in a polyethylene carrier | Polyfil Corporation, Rockaway, NJ | 12% |
| | | | | POLYFIL ABC 5000 | Antiblock concentrate resin in a polyethylene carrier | | 4.0% |
| | | | | AMPACET 10407 | Hindered amine light stabilizer (HALS) | Ampacet U.S.A., Tarrytown, NY | 4.0% |

EXAMPLES

Test Methods

Elongation at Break and Ink Flaking (Anchorage) Testing

These tests were carried out by fixing a six-inch long (15.4 centimeter long) one-inch (2.54 centimeter) wide strip of the sample in an INSTRON 5564 machine (available from Instron Corporation, Canton, Mass.), and stretching at a rate of 10 inches per minute (25.4 centimeters per minute) according to ASTM D3759. The determination of the percent elongation where ink flaking occurs was done using the The film was formed by coextrusion, which may be carried out by known processes. Techniques of coextrusion are found in many polymer processing references, including Progelhof, R. C., and Throne, J. L. "Polymer Engineering Principles", Hanser/Gardner Publications, Inc., Cincinnati, Ohio, 1993.

The films of Comparative Examples C1–C4 are shown below in Table 2.

TABLE 2

| Example No. | Trade Name | Description | Supplier |
|---|---|---|---|
| 1 | N/A | Polyolefin film with BYNEL/ELVALOY/PARALOID B67N layer | Structure described in Table 1 |
| C1 | VCC-9929 | 4 mils (102 micrometer gauge) extruded vinyl | 3M Commercial Graphics Division, St. Paul, MN |
| C2 | 3540 | Multilayer polyolefin film | |
| C3 | EPH-150 | Oriented polypropylene synthetic paper | Nan Ya Plastic Corporation, Taipei, Taiwan, R.O.C. |
| C4 | N/A | Single layer LLDPE film* | |

*The LLDPE film of Comparative Example 4 is a linear low density polyethylene film made by the same method as that used to make the film of Example 1 (shown in Table 1) except that it consisted of a single layer at 4.0 mils (102 microns) of the core formulation.

Printing and Testing, Example 1 and Comparative Examples C1, C2, C3 and C4

The film described in Table 1 was tested for printing and mechanical properties of the printed samples against some commercially available materials (C1–C4) shown in Table 2. In order to facilitate screen-printing of the films of Example 1 and Comparative Example C4, a pressure sensitive adhesive layer on a release liner (adhesive/liner) was laminated to the film samples before printing using a laminating nip. The prime layer side of the film of Example 1 was laminated against the pressure sensitive adhesive side of the adhesive/liner.

The films of Example 1 and C1 were line color printed with UV-cured screen-printing inks using the methods described in U.S. Pat. No. 4,737,224. One sample was printed with one layer of ink, a second sample was printed with two layers of ink, and further samples were printed with three, four, and five layers of ink, respectively. This was done for both Example 1 and C1. For each ink layer, the print areas were 100 percent fill, i.e., a continuous layer or block of ink of the color was printed. Printing was carried out using Coates UVN-MP screen print ink (available from Coates Screen), using a 380-mesh screen. After each pass, the freshly printed ink layer was cured at 0.110 J/cm$^2$ for each pass. Each sample was cured between each successive layer of ink. If there were less than five layers of ink, the sample was passed under the UV-cure station a total number of five passes.

The percent elongation at break and Elmendorf Tear resistance were tested for the film of Example 1 and C1. Results are given below in Table 3.

TABLE 3

| Number of Screen Printed Ink Layers | Percent Elongation at Break | | Elmendorf Tear/Grams Per Ply | |
|---|---|---|---|---|
| | Example 1 | C1 | Example 1 | C1 |
| 0 | 1220 | 544 | 1621 | 240 |
| 1 | 1260 | 372 | 1099 | 107 |
| 2 | 1344 | 124 | 981 | 80 |
| 3 | 1280 | 52 | 672 | 85 |
| 4 | 1164 | 24 | 624 | 101 |
| 5 | 980 | 16 | 635 | 139 |

Samples of all of the films (Example 1 and C1–C4) were printed with five layers of ink and a hand-tearing test was performed and general observations were noted. The results are shown below in Table 4.

Another set of one-inch wide sample strips of all film types printed with five layers of Coates ink were stretched in an INSTRON machine at 10 inches (25.4 centimeters) per minute, and the percent elongation of at which ink began to flake off the sample was noted. These results are also included in Table 4.

TABLE 4

| Example No. | Hand Tear Observations | % Elongation, Onset of Ink Flaking, Five Layers of Ink |
|---|---|---|
| 1 | Hard to tear, excellent ink anchorage both before and during stretching | 60% |
| C1 | Easy to tear, good ink anchorage | 30% |
| C2 | Hard to tear, bad ink anchorage when stretched | 10% |
| C3 | Hard to tear, ink anchored at low stretch but poor anchorage on stretching | 10% |
| C4 | Hard to tear, but almost no ink anchorage | <5% |

Examples 2 to 5

Film

Examples 2 to 5 utilized XP-6427A, a white cast film, commercially available from Pliant Corporation, Schamburg, Ill.

Coating Composition A

NEOREZ R600 aliphatic urethane dispersion (800 g) (available from Avecia Ltd.) and NEOCRYL A612 aqueous acrylic emulsion (200 g) (Avecia Ltd.) were blended together in a 4 L container, covered and shaken by hand. Deionized water (500 g) was added and mixed, then 500 g of isopropyl alcohol (IPA) was added and mixed. The percent solids of the final composition were measured to be 16.4 weight percent.

Coating Composition B

NEOPAC R9000 aqueous urethane copolymers (40 percent solids) (400 g) (Avecia Ltd.) and NEOCRYL A612 aqueous acrylic emulsion (100 g) were blended together in the same manner as Coating Composition A, but were diluted with 2296 g deionized water and 984 g IPA to yield a final composition which was 5.0 weight percent solids.

Coating Composition C

NEOPAC R9000 aqueous urethane copolymers as obtained.

Coating Composition D

NEOPAC R9000 aqueous urethane copolymer dispersion was diluted to 20 weight percent solids with a 50/50 blend of deionized water and IPA.

The films were coated on their shiny sides with aqueous polyurethane coating formulations on a Hirano Coater (Model M-2001, available from Hirano Tecseed Co. Ltd., Nara, JP) using a ruling mill gravure roll having a volume factor of 36.2 billion cubic micrometers/in$^2$. The coated films were dried by pulling the film through a six-meter long forced air oven set at 85° C. at the film speed given in the roll ratio described below in Table 5. The coated films were laminated with a removable, microsphere based, pressure sensitive acrylate adhesive that was made from a blend of a dispersion of hollow tacky microspheres prepared as described in WO 92/13924, Example 1, and a non spherical acrylate adhesive commercially available from 3M Company, St. Paul Minn., under the trade designation FAST-BOND 49 at a ratio of 46 to 54. This blend had first been coated onto a silicone-coated liner at a wet thickness of 3 mils (0.008 cm), and then dried at 150° F. (66° C.) for ten minutes. The film samples were coated with two line colors layers of Coates UVMP and cured as described above. The imaged articles were tested for elongation at break and ink flaking as described above. The data are shown in Table 5.

TABLE 5

| Example No. | Coating Solution | Roll Ratio | Second Coating Solution | Roll Ratio | % Elongation at Ink Flaking |
|---|---|---|---|---|---|
| 2 | A | 10 to 8 | B | 15 to 5 | 40 |
| 3 | B | 15 to 12 | None | N/A | 35 |
| 4 | C | 10 to 10 | None | N/A | 20 |
| 5 | D | 10 to 10 | None | N/A | 20 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An imaged article comprising A) an image receptive layer bonded to a core layer, the image receptive layer comprising a blend of i) a carrier resin comprising modified polyolefin or polyurethane resin, or combinations thereof; and ii) an ink-anchoring resin selected from the group consisting of copolymers of methyl methacrylate with butyl acrylate, butyl methacrylate, isobutyl methacrylate, or isobornyl methacrylate; copolymers of isobutylmethacrylate and butyl methacrylate; polymers of isobutyl methacrylate; copolymers of urethane and acrylate, acrylic polymers, and combinations thereof; and B) an image on the image receptive layer, the image comprising a UV-curable ink.

2. The imaged article of claim 1 wherein carrier resin is the reaction product of an olefin monomer and a polar monomer.

3. The imaged article of claim 1 wherein ink-anchoring resin is present in the image receptive layer at a level of from about 10 to about 50 weight percent.

4. The imaged article of claim 1 wherein the core layer is non-plasticized.

5. The imaged article of claim 4 wherein the core layer comprises polyester, polyolefin, polyamide, polycarbonate, polyurethane, copolymers of polyurethane, polystyrene, acrylic, or combinations thereof.

6. The imaged article of claim 1 wherein the core layer has an adhesive on a surface opposite the image receptive layer.

7. The imaged article of claim 6 having a prime layer between the adhesive and the core layer.

8. The imaged article of claim 1 wherein the image receptive layer comprises a carrier resin selected from the group consisting of acid/acrylate modified ethylene vinyl acetate resin, terpolymer of ethylene/vinyl acetate/carbon monoxide/ethylene, and combinations thereof.

9. The imaged article of claim 1 wherein the ink-anchoring resin is selected from the group consisting of a copolymer of methylmethacrylate and butylacrylate, a copolymer of methylmethacrylate and isobutylmethacrylate, a polymer of isobutylmethacrylate, copolymers of urethane and acrylate, acrylic polymers, and combinations thereof.

10. The imaged article of claim 6 wherein the adhesive is a pressure sensitive adhesive, a repositionable adhesive, a positionable adhesive, or a hot melt adhesive.

11. The imaged article of claim 7 attached to glass or metal.

12. A method of printing with an inkjet printer comprising the step of jetting a UV-curable inkjet ink onto an image receptor medium that comprises an image receptive layer comprising a blend of i) a carrier resin comprising modified polyolefin or polyurethane resin, or combinations thereof; and ii) an ink-anchoring resin selected from the group consisting of copolymers of methyl methacrylate with butyl acrylate, butyl methacrylate, isobutyl methacrylate, or isobornyl methacrylate; copolymers of isobutylmethacrylate and butyl methacrylate; polymers of isobutyl methacrylate; copolymers of urethane and acrylate; acrylic polymers, and combinations thereof.

13. The method of printing of claim 12 wherein the image receptive layer comprises a carrier resin selected from the group consisting of acid/acrylate modified ethylene vinyl acetate resin, terpolymer of ethylene/vinyl acetate/carbon monoxide/ethylene, and combinations thereof.

14. The method of printing of claim 12 wherein the core layer comprises polyester, polyolefin, polyamide, polycarbonate, polyurethane, copolymers of polyurethane, polystyrene, acrylic, or combinations thereof.

15. The method of printing of claim 12 wherein the ink-anchoring resin is selected from the group consisting of a copolymer of methylmethacrylate and butylacrylate, a copolymer of methylmethacrylate and isobutylmethacrylate, a polymer of isobutylmethacrylate, copolymers of urethane and acrylate, acrylic polymers, and combinations thereof.

16. A method of using a graphic article comprising the steps of:

providing an imaged graphic article, the graphic article comprising a core layer bonded to an image receptive layer, and an adhesive on a surface of the core layer opposite the image receptive layer, the image receptive layer comprising a blend of i) a carrier resin comprising modified polyolefin or polyurethane resin, or combinations thereof; and ii) an ink-anchoring resin selected from the group consisting of copolymers of methyl methacrylate with butyl acrylate, butyl methacrylate, isobutyl methacrylate, or isobornyl methacrylate; copolymers of isobutylmethacrylate and butyl methacrylate; polymers of isobutyl methacrylate; copolymers of urethane and acrylate; acrylic polymers, and combinations thereof, adhering said imaged graphic article onto a smooth surface at a time T1; and removing said imaged graphic article at a time T2, wherein said image graphic is removed in substantially one piece, wherein T2 is greater than T1.

17. The method of claim 16 wherein the amount of time between T1 and T2 ranges from 7 days to 365 days.

18. The method of claim 16 wherein the smooth surface comprises glass or metal.

19. The method of claim 16 wherein the adhesive is respositionable.

20. The method of claim 16 wherein the carrier resin is selected from the group consisting of acid/acrylate modified ethylene vinyl acetate resin, terpolymer of ethylene/vinyl acetate/carbon monoxide/ethylene, and combinations thereof.

* * * * *

UNITED STATES PATENT AND TRADEMARK OFFICE
CERTIFICATE OF CORRECTION

PATENT NO. : 6,857,737 B2
APPLICATION NO. : 10/328523
DATED : February 22, 2005
INVENTOR(S) : Jeffrey O. Emslander Page 1 of 1

It is certified that error appears in the above-identified patent and that said Letters Patent is hereby corrected as shown below:

Column 12, Claim 16
Line 49, delete "," following "thereof" and insert in place thereof --;--.
Line 60, delete "respositionable" and insert in place thereof --repositionable--.

Signed and Sealed this

Sixth Day of March, 2007

JON W. DUDAS
*Director of the United States Patent and Trademark Office*